United States Patent
Allen

(10) Patent No.: US 10,907,443 B2
(45) Date of Patent: Feb. 2, 2021

(54) OILFIELD CHOKE WITH TEARDROP SHAPED FLOW ORIFICES

(71) Applicant: Jack Allen, Porter, TX (US)

(72) Inventor: Jack Allen, Porter, TX (US)

( * ) Notice: Subject to any disclaimer, the term of this patent is extended or adjusted under 35 U.S.C. 154(b) by 0 days.

(21) Appl. No.: 16/232,895

(22) Filed: Dec. 26, 2018

(65) Prior Publication Data

US 2019/0195046 A1    Jun. 27, 2019

Related U.S. Application Data

(60) Provisional application No. 62/606,500, filed on Dec. 27, 2017.

(51) Int. Cl.
*E21B 34/02* (2006.01)
*F16K 3/24* (2006.01)
*F16K 3/34* (2006.01)
*F16K 31/50* (2006.01)

(52) U.S. Cl.
CPC .............. *E21B 34/02* (2013.01); *F16K 3/24* (2013.01); *F16K 3/246* (2013.01); *F16K 3/34* (2013.01); *F16K 31/508* (2013.01)

(58) Field of Classification Search
CPC . E21B 34/02; F16K 3/24; F16K 3/246; F16K 3/34; F16K 31/508
See application file for complete search history.

(56) References Cited

U.S. PATENT DOCUMENTS

| | | | | |
|---|---|---|---|---|
| 1,892,260 A | * | 12/1932 | Wick | E04F 21/12 239/346 |
| 4,446,887 A | * | 5/1984 | Redmon | F16K 47/04 137/556 |
| 4,471,942 A | * | 9/1984 | Kocanowski | A61M 5/16877 251/115 |
| 5,368,276 A | * | 11/1994 | Pfeiffer | B01J 8/082 137/240 |
| 6,276,458 B1 | * | 8/2001 | Malone | E21B 21/10 166/386 |
| 7,426,938 B2 | * | 9/2008 | Bohaychuk | E21B 34/02 137/625.33 |
| 7,699,075 B2 | * | 4/2010 | Bohaychuk | E21B 34/04 137/625.33 |
| 8,490,652 B2 | * | 7/2013 | Bohaychuk | F16K 3/24 137/375 |
| 9,243,717 B2 | * | 1/2016 | Rolland | E21B 21/106 |
| 9,291,094 B2 | * | 3/2016 | Graichen | F02B 37/183 |
| 9,759,347 B2 | * | 9/2017 | Elliott | F16K 47/08 |
| 10,007,273 B2 | * | 6/2018 | Martino | E21B 34/02 |
| 10,012,325 B2 | * | 7/2018 | Bohaychuk | E21B 34/02 |
| 2016/0223089 A1 | | 8/2016 | Nijland | F16K 3/04 |
| 2019/0107222 A1 | * | 4/2019 | Klyashitsky | F16K 31/163 |

* cited by examiner

*Primary Examiner* — Aaron L Lembo
(74) *Attorney, Agent, or Firm* — Dossey & Jones, PLLC; Phillip Black

(57) ABSTRACT

A cage for a choke valve assembly and method for using the same is provided. The cage includes one or more teardrop shaped orifices for the manipulation of fluid flow through the choke valve assembly.

8 Claims, 4 Drawing Sheets

OILFIELD CHOKE WITH TEARDROP SHAPED FLOW ORIFICES

PRIORITY

Claim Priority to Provisional Patent Application

This application is a non-provisional utility patent application claiming priority to previously filed provisional patent application titled "Automated or Manually Operated Oilfield Choke with Teardrop Shaped Flow Orifices" and having application No. 62/606,500 and filed on Dec. 27, 2017.

BACKGROUND

The present invention is directed to a choke valve seat with a plurality of teardrop shaped flow orifices to regulate flow passing through the choke valve.

DESCRIPTION OF RELATED ART

The control of flow is a requirement to obtain safe, flexible and reliable operations of high-pressure oilfield production systems. A choke valve is a type of control valve, mostly used in oil and gas production wells to control the flow of well fluids being produced. Production fluids typically include crude oil, water, and natural gas.

Choke valve assemblies allow for the control of production fluids exiting the well. They often include a mechanism to allow for the increase or decrease in flow rate, which in turn allows the controller to control reservoir pressure and well production. Choke valves also allow high pressure wellhead flow to enter pressure restricted pipelines.

Most fluid flowing through the choke valve is under high pressure, high flow rate, and often contains sand and other particles brought to the surface during well production. Such conditions often cause the choke valve and other surface equipment to encounter erosion and corrosion problems. The erosion and corrosion often causes the surface equipment to fail, resulting in costly down-time for the well while the equipment is replaced.

Therefore, a need exists for a modification to current choke valves to reduce problems caused by fluid during production.

SUMMARY

The disclosed choke valve comprises an internal chamber or cavity that houses seat carrier with an abrasion resistant insert (referred to herein as the "cage" or "cage insert"). The fluid flows into the choke valve through an inlet, through the seat carrier and cage, and out of the choke valve through an outlet. The seat carrier and cage insert are both generally cylindrical and configured such that the cage insert slidably fits in the interior of the seat carrier. One or more holes can be disposed in the wall of the seat carrier and each of those can align with a corresponding hole disposed in the wall of the cage insert. When the holes are aligned, the fluid flows through the choke valve, part of its path being through the aligned holes. To alter or manipulate the flow rate, the flow control member can be moved in relation to the orifice in the cage and the seat carrier such that the hole alignment increases or decreases, thereby increasing or decreasing flow volume respectively.

One aspect of this invention is to manipulate the shape of the one or more holes disposed in the wall of the cage insert or of the seat carrier. The changing of the shape of these orifices can change the way the fluid flows through the choke valve. Ideally, the manipulation in shape can result in a reduction of shear force and emulsification of the fluid, and also result in a reduction of corrosion and erosion of the surface equipment, notably the choke valve.

Another aspect of the invention is to present teardrop shaped holes, or orifices, and manipulation of the position of the internal sliding flow control member such that the regulation of the pressure passing through the choke valve is regulated more uniformly thereby reducing erosion of the interior of the choke valve body.

Additional aspects of the choke with teardrop shaped flow orifices can include methods of making and using the same in accordance with the foregoing aspects. It should also be noted that the choke with teardrop shaped flow orifices further encompasses the various possible combinations of the aspects and features disclosed herein.

BRIEF DESCRIPTION OF THE DRAWING(S)

The accompanying drawings illustrate various exemplary implementations and are part of the specification. The illustrated implementations are proffered for purpose of example, not for purpose of limitation.

DETAILED DESCRIPTION

The apparatus disclosed herein can include a manipulation to a current choke valve apparatus or the manufacture of a new choke valve apparatus. Manipulation of an existing choke valve apparatus can include the replacement of one or both of the seat carrier or cage insert.

Figure 1:
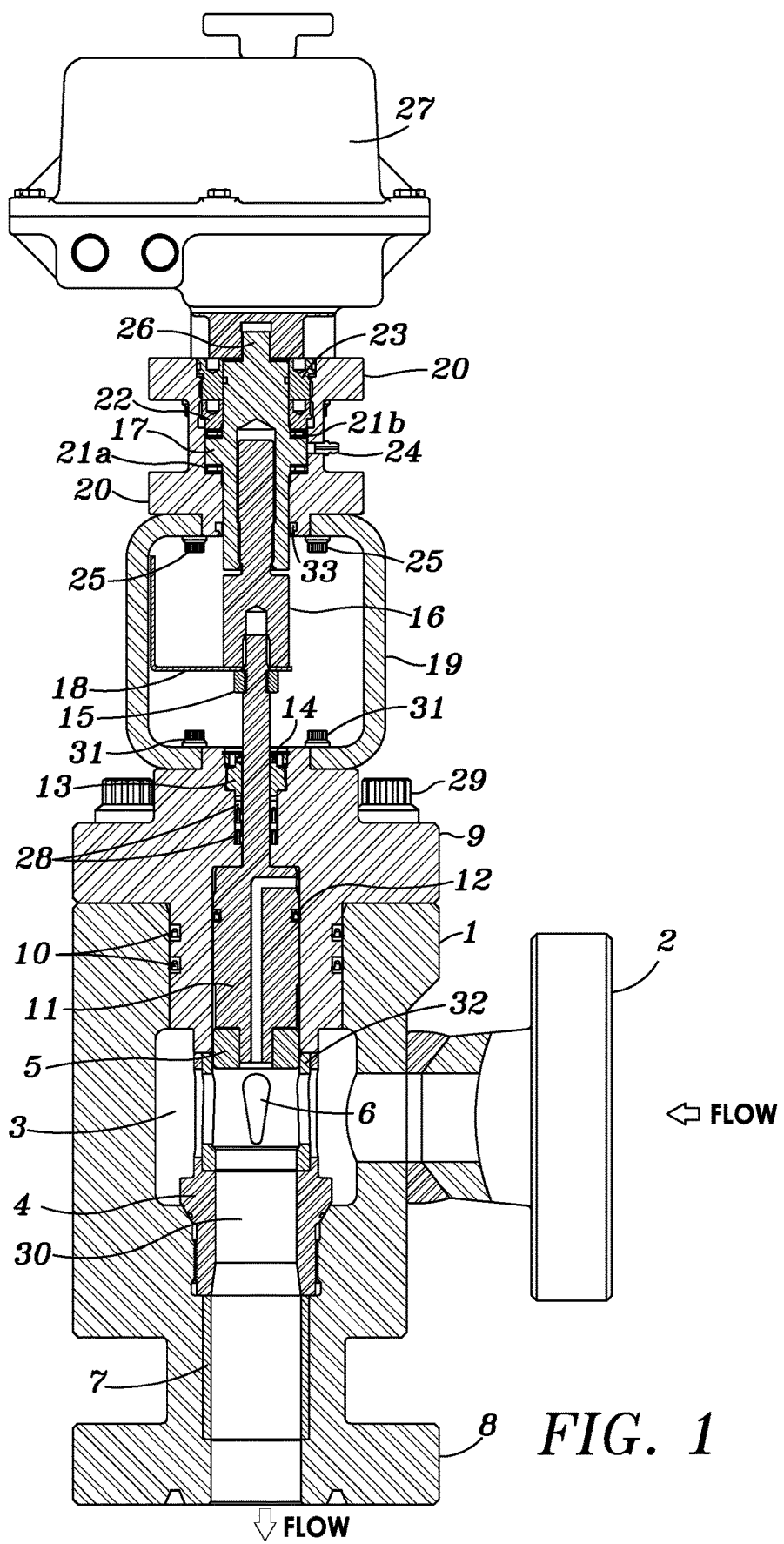
FIG. 1 depicts a cross-sectional view of a choke valve assembly, as shown and described herein.
Figure 2:
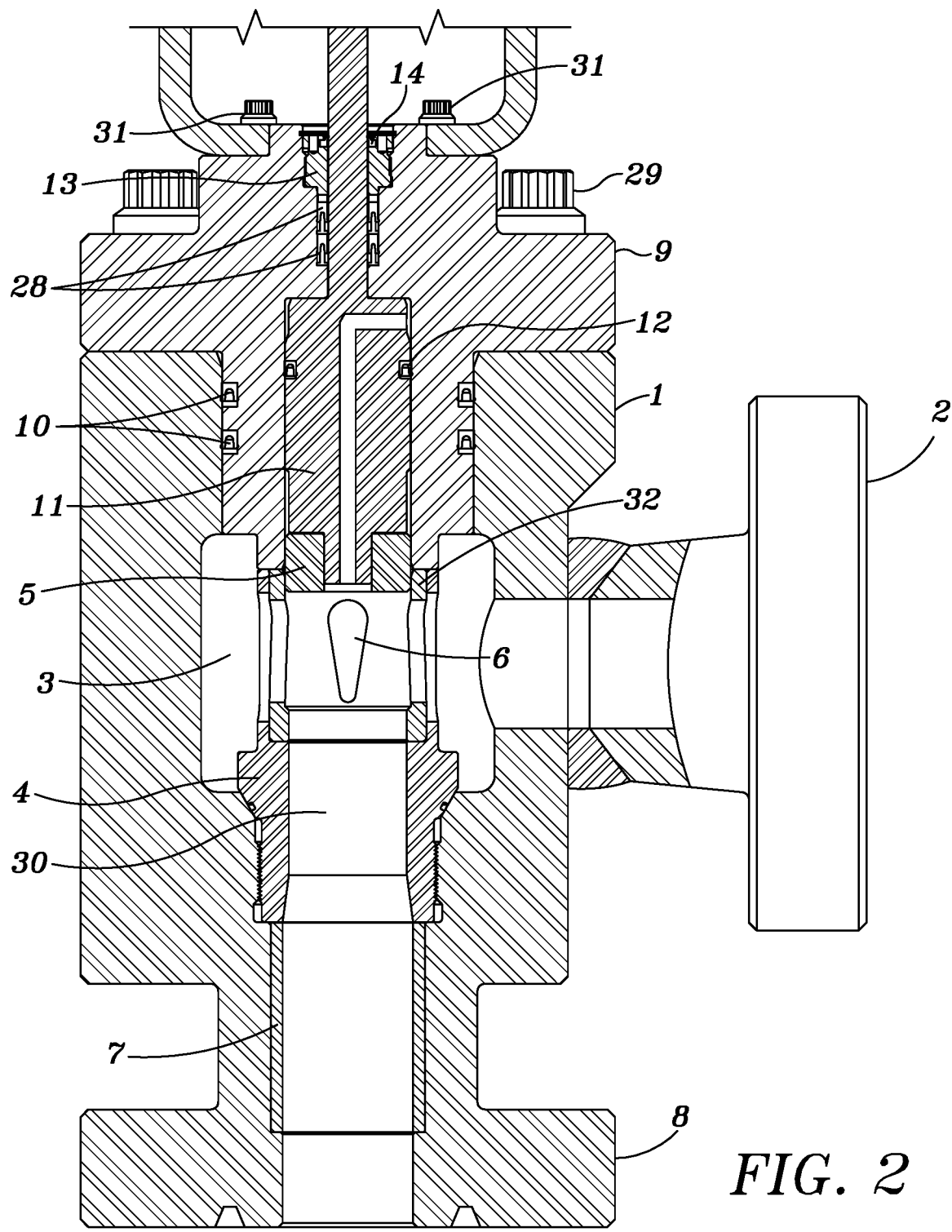
FIG. 2 depicts a cross-sectional close-up view of the bottom portion of the choke valve assembly of FIG. 1, as shown and described herein.
Figure 3:
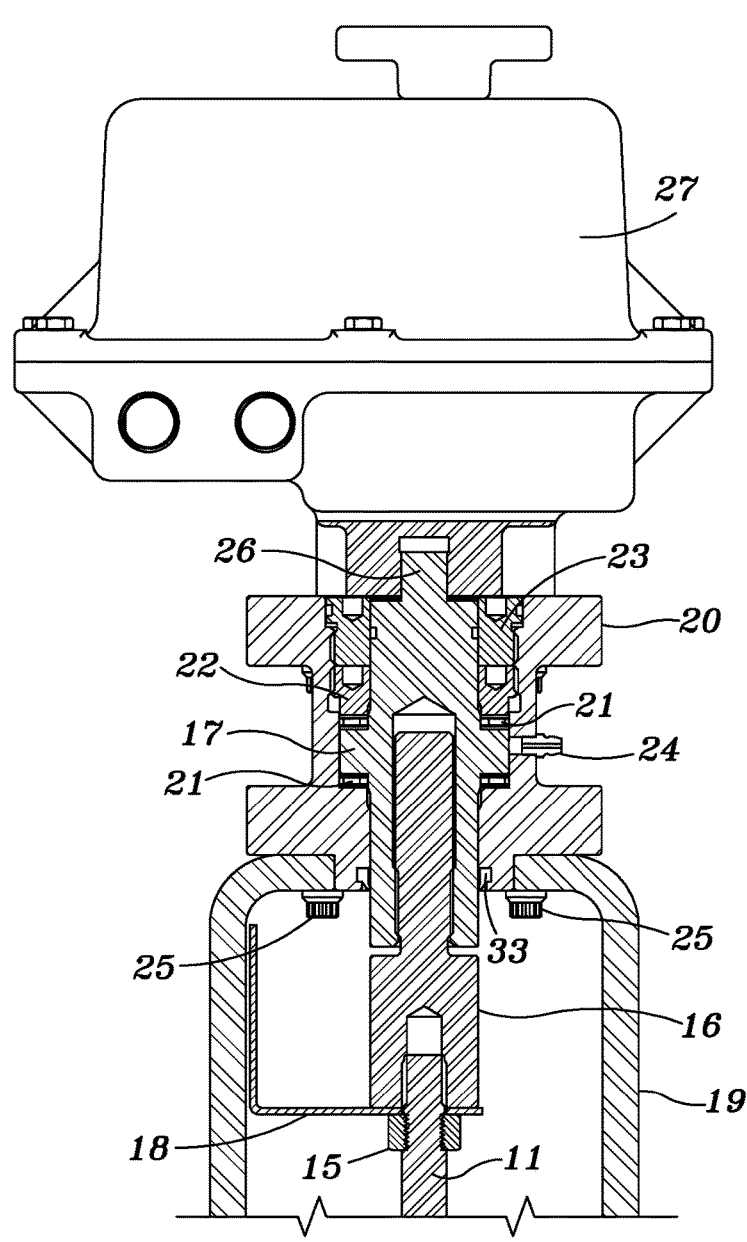
FIG. 3 depicts a cross-sectional close-up view of the top portion of the choke valve assembly of FIG. 1, as shown and described herein.

FIG. 1 depicts a cross-sectional view of a choke valve assembly. FIG. 2 depicts a cross-sectional close-up view of the bottom portion of the choke valve assembly of FIG. 1 and FIG. 3 depicts a cross-sectional close-up view of the top portion of the choke valve assembly of FIG. 1.

The choke valve assembly can include a choke valve body 1 comprising an inlet 2, an internal chamber 3, and an outlet 8. The internal chamber 3 can house a choke valve seat carrier 4 with a cage 32 about a top portion and an abrasion resistant sleeve 7 extending there below or in a bottom portion. In other words, the abrasion resistant sleeve 7 can be disposed in the choke valve body 1 below the seat carrier 4 and above the choke valve outlet 8.

The choke valve body 1 can accept and house a bonnet 9 that is secured into place by one or more fasteners 29, most often secured directly to the choke valve body 1. The bonnet 9 can have a protruding nose with plurality of sealing members 10 on the exterior of the nose. The sealing members 10 can also secure, or effective connect and/or seal, the bonnet 9 to the choke valve body 1, as shown, at a position along the internal wall of the choke valve body 1.

The bonnet 9 consists of an internal lower cavity that accepts and houses an internal sliding flow control member 11. The bonnet 9 also has an internal upper cavity that accepts and houses sealing members 28 that seal around the shaft of the internal sliding flow control member 11. The upper cavity of the bonnet 9 also accepts and houses a packing retainer 13 above the sealing members 28. The packing retainer 13 has an internal profile that accepts and houses a wiper ring 14.

The choke valve body cavity is threaded to accept and otherwise connect to the seat carrier 4 and the cage 32. Once disposed and secured into the choke valve body 1, the seat carrier 4 and cage 32 typically do not move in relation to one another. The internal sliding flow control member 11 with abrasion resistant nose 5 and sealing member 12 is inserted into the cavity of the bonnet 9. As discusses later, the flow control member 11 slidably engages the inner wall of the cage 32 such that the flow control member 11 limits the amount that the fluids are allowed to travel or flow through the orifices 6, 36 by limiting the surface area of the orifices 6, 36 that the fluid is allowed to travel through.

Several components of the choke valve act to connect or control the movement and position of the flow control member 11. The bonnet 9 is fastened to the choke valve body 1 by a plurality of threaded fasteners 29; the bonnet 9 acting as a housing for one or more components for regulating the flow control member 11. For example, the shaft of the flow control member 11 is threaded to mate with a threaded actuator shaft 16 which mates with a rotor shaft 17 providing linear movement of the internal sliding flow control member 11. The threaded actuator shaft 16 has an external thread that mates with an internal threaded cavity of a rotor shaft 17 allowing linear movement of the threaded actuator shaft 16 and the internal sliding flow control member 11.

The threaded actuator shaft 16 and the internal sliding flow control member 11 are prevented from rotating by the anti-rotation plate 18 that resists rotation by contact with the inside surface of the yoke 19. The anti-rotation plate 18 is held in place by a lock nut 15 clamping the anti-rotation plate 18 between the actuator shaft 16 and the lock nut 15.

The rotor shaft 17 can be inserted into a shaft housing 20 that has an internal cavity that accepts and houses the rotor shaft 17. The rotor shaft 17 can be mounted between a lower bearing 21a and an upper bearing 21b, the bearings 21 can be retained by a threaded retainer 22 and a threaded lock retainer 23. The shaft housing 20 can have a fitting 24 that allows for the lubrication of the internal bearings 21. The shaft housing 20 can be mounted to the top of the yoke 19 with a plurality of threaded fasteners 25. The yoke 19 can be attached to the choke valve bonnet 9 with a plurality of threaded fasteners 31.

The rotor shaft 17 can have a protrusion 26 that mates with an operator 27; accomplished by the protrusion seated or otherwise housed in an internal cavity of the operator 27. The operator can be electric or pneumatic and controlled by satellite or any other remote means. The operator 27 can control the flow of the fluid through the choke valve assembly by manipulating the amount of fluid allowed to flow through the orifices 6, 36 of the seat carrier 4 and cage 32. To accomplish this, the operator 27 can raise or lower the internal sliding flow control member 11. The flow control member 11 and its nose 5 can be sized such that its outer diameter closely abuts the interior diameter of the cage 32. The term "closely abuts" can mean a touching close enough to prevent fluid from flowing between the outer wall of the flow control member 11 (and/or its nose 5) and the interior wall of the cage 32, even at high pressures. The purpose of the flow control member 11 (and its nose 5) is to restrict or prevent fluid flowing through the choke valve assembly by moving the flow control member 11 (and its nose 5) up or down in relation to the orifices 6, 36 so as to increase or decrease the opening, the orifices, through which the fluid may flow.

As shown in FIG. 2, the internal sliding flow control member 11 is in a fully "open" position, allowing maximum flow volume to pass through the orifices 6, 36 and move downstream through the outlet 8. However, though not shown, one or more closed or semi-closed positions of the choke valve assembly can be selected by moving the flow control member 11 downward, partially or completely covering the orifices 6, 36. Doing so reduces the amount of fluid allowed to flow through the orifices 6, 36 because a portion or all of the orifice is covered by the sliding flow member 11 and/or its nose 5.

Figure 5:
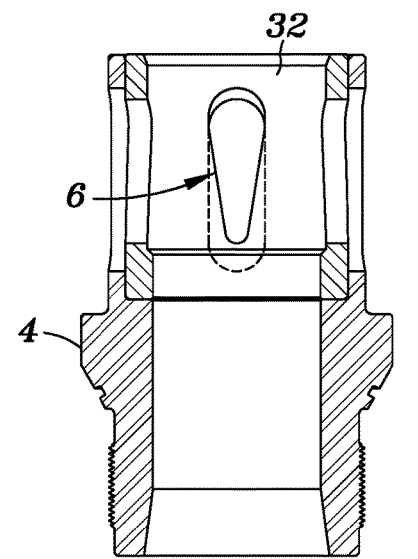
FIG. 5 depicts a cross-sectional view of the assembled cage and seat carrier, as shown and described herein.
Figure 6:
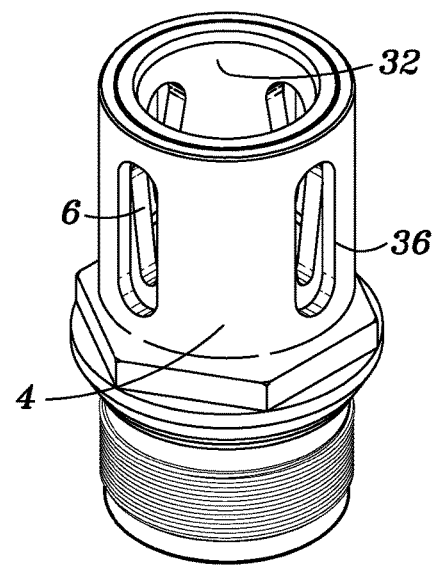
FIG. 6 depicts a perspective view of the assembled cage and seat carrier, as shown and described herein.
Figure 4:
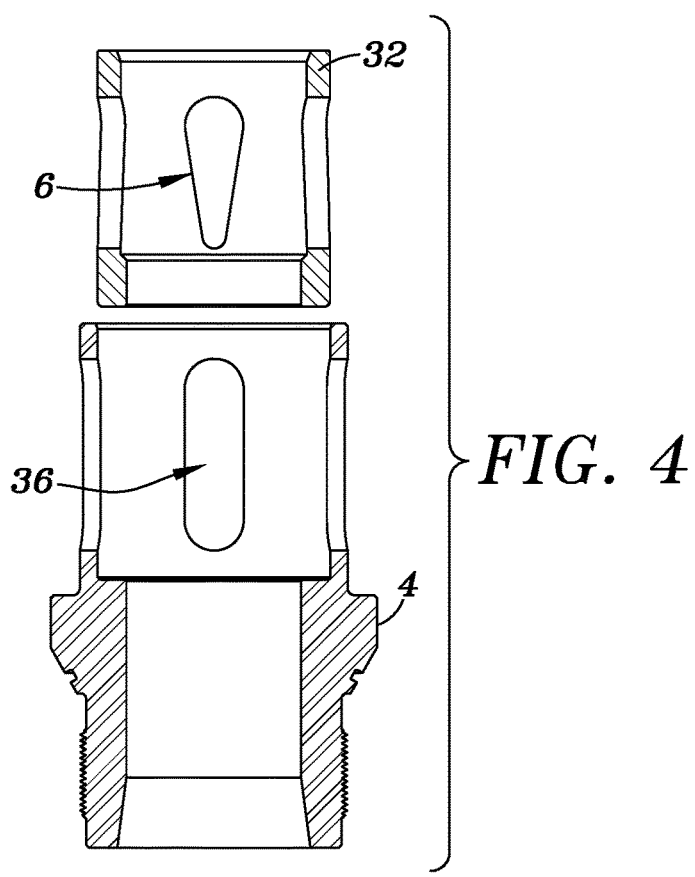
FIG. 4 depicts a cross-sectional view of the disassembled cage and seat carrier, as shown and described herein.

FIG. 4 depicts a cross-sectional view of the disassembled cage and seat carrier and FIG. 5 depicts a cross-sectional view of the assembled cage and seat carrier. FIG. 6 depicts a perspective view of the assembled cage and seat carrier.

As shown in FIGS. 4-6, the cage 32 can include one or more orifices disposed in its wall that are generally lachrymiform, or "teardrop" shaped. The teardrop shape is generally described in two-dimensional form. The teardrop shaped orifice can be generally rounded about its ends, having one end larger than the other end. In other words, the diameter of the rounded portion of a first end is larger than the diameter of the rounded portion of a second end.

The cage 32 can include a varying number of teardrop shaped orifices cut out of its radial wall. For example, one or more teardrop shaped orifices, two or more teardrop shaped orifices, three or more teardrop shaped orifices, four or more teardrop shaped orifices, five or more teardrop shaped orifices, six or more teardrop shaped orifices, seven or more teardrop shaped orifices, eight or more teardrop shaped orifices, nine or more teardrop shaped orifices, or ten or more teardrop shaped orifices can be disposed in the radial wall of the cage 32. Each teardrop shaped orifice disposed in the cage 32 can have a corresponding orifice disposed in the seat carrier 4.

The seat carrier 4 and cage 32 are both generally cylindrical and configured such that the cage 32 fits in the interior of the seat carrier 4. One or more orifices can be disposed in the wall of the seat carrier 4 and those orifices can be generally elliptical in shape. Though not shown, the shape of the seat carrier orifices 36 can vary, however, and include other elongated shapes chosen to correspond with the shaped orifice 6 of the cage 32. For example, the seat carrier orifice 36 can be teardrop shaped and aligned with the orifice 6 of the cage 32 such that shape and size of the two orifices 6, 36 completely align with the choke valve is in a fully open position. In another alternative embodiment, the cage 32 can be absent and the orifice(s) in the seat carrier 4 can be teardrop shaped.

The number and/or size of the orifices can vary but generally depends on the size of the choke. In other words, the number and size of the orifices is generally selected by determining the volume of fluid able to go through the inside bore 30 and/or sleeve 7 and selecting the size and/or number of orifices such that the total surface area of the orifices, when totally open, allows the same volume of fluid to pass through. The number of orifices is selected based on a duplication of enough orifices to equal the maximum size of the orifice would be (so a one-inch choke has a max volume to match one inch and then you can close the holes from).

As the fluid enters through the inlet 2, it is directed to the internal chamber 3. The fluid typically circulates in the chamber around the cage 32/seat carrier 4 ensemble until it is pushed through the orifices 6, 36 into the internal volume of the cage 32/seat carrier 4 ensemble. As it enters the internal volume of the cage 32/seat carrier 4 ensemble, the fluid flows in many patterns or directions, causing emulsion and direction change of the fluid. In some flow patterns shown in simulations, the fluid, or at least a large portion of the fluid, flows in an upward direction and contacts the bottom surface of the nose 5 of the flow control member 11. The fluid is then shown to flow downward toward the outlet. Some simulations show that the fluid is forced into a vortex flow pattern as it travels downward and away from the flow control member 11. As the fluid travels downward from the cage 32/seat carrier 4 ensemble, a large pressure drop can occur as the fluid flows into the inside bore 30, through the sleeve 7, and exit the choke valve through the outlet 8.

The flow through the plurality of the teardrop shaped orifices 6 is regulated by an internal sliding flow control member 11 inside the cage 32 and the seat carrier 4. The flow control member 11 can be positioned at a selected position in relation to the orifices 6, 36 such that the "open" portion of the orifices 6, 36 determines the amount of fluid allowed to travel downstream to the outlet 8.

Figure 6A:
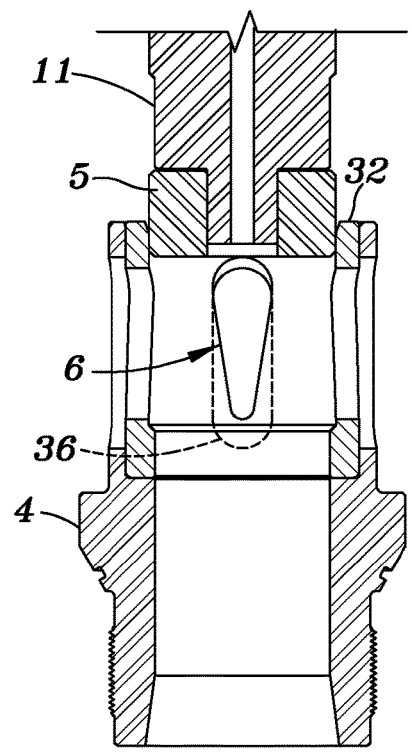
FIG. 6a depicts a cross-sectional view of the cage/seat carrier ensemble with the flow control member in the open position, as shown and described herein.
Figure 6B:
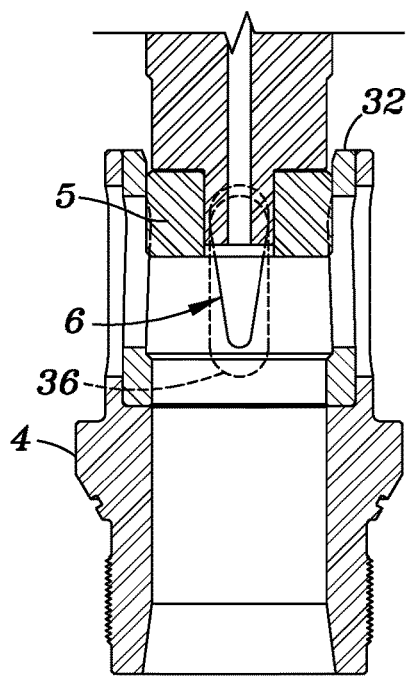
FIG. 6b depicts a cross-sectional view of the cage/seat carrier ensemble with the flow control member in a partial closed position, as shown and described herein.
Figure 6C:
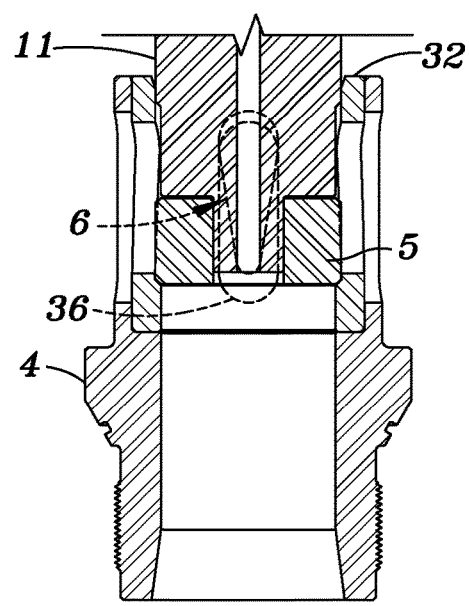
FIG. 6c depicts a cross-sectional view of the cage/seat carrier ensemble with the flow control member in the fully closed position, as shown and described herein.

FIG. 6a depicts a cross-sectional view of the seat carrier and cage with the flow control member in the open position, FIG. 6b depicts a cross-sectional view of the seat carrier and cage with the flow control member in a partial closed position, and FIG. 6c depicts a cross-sectional view of the seat carrier and cage with the flow control member in the fully closed position, as shown and described herein. As shown, the flow control member 11 can be moved downward and upward so as to decrease or increase the amount of fluid allowed to flow through the orifices 6, 36. As the flow control member 11 moves from a totally closed position, as shown in FIG. 6c, the lower portion of the teardrop shaped orifice 6 is gradually exposed allowed fluid to flow there through. When the flow control member 11 is in a partially open position, that is not fully opened and not fully closed, an example of which is FIG. 6b, the fluid is allowed to flow through the orifices 6, 36 in the cage 32 and seat carrier 4 in a controlled amount. "Amount" as referred to herein generally means the volume of fluid allowed to flow through for any set period of time; consequently, the fluids flow rate. The amount of flow rate is controlled by increasing or decreasing the surface area of the orifices 6, 36 that the fluid is allowed to flow through.

Because the teardrop shape is inverted such that the end having the smaller radius is located in the downward most position and the end having the larger radius is located in the upward most position, the gradually widening shape of the opening through which the fluid will be able to flow will have beneficial effects.

The geometry of the teardrop shaped orifices 6 is such that the regulation or throttling of the media passing through the teardrop shaped orifices 6 is regulated more efficiently and accurately without any sudden increase or decrease of pressure if the sliding flow control member must be re-positioned to control the outlet 8 flow. Moreover, the teardrop shaped orifices 6 allow for a more precise and uniform flow area when the internal sliding flow control member 11 is positioned at a predetermined location for regulating the required decrease in the outlet 8 pressure.

The teardrop shape of the holes provides for a more precise and uniform flow of the fluid than that found in other choke valve systems. This improved flow results in less turbulence within the choke valve. Less turbulence results in less emulsion problems with the fluid and less erosion of the choke valve body immediately downstream of the choke valve seat or seat carrier. Less turbulent fluid flow also results in a reduction of sound or noise and/or vibration caused by the movement of the fluid.

The teardrop shape of the hole(s) also reduces the Joule Thomson effect, as it reduces the kinetic energy of the fluid being converted to thermal energy by means of turbulence when impinging onto itself.

Although the present choke with teardrop shaped orifices have been described with respect to specific details and embodiments, it is not intended that such description be regarded as limitations on the scope of the apparatus. It will thus be appreciated that those skilled in the art will be able to devise numerous alternative arrangements that, while not shown or described herein, embody the principles of the disclosure and thus are within its spirit and scope.

What is claimed is:

1. A choke valve assembly, comprising:
   a choke valve body comprising an internal chamber comprising:
      a seat carrier, and
      a cage having a side wall forming an internal bore, wherein one or more teardrop shaped orifices is disposed in a sidewall of the cage to reduce the turbulence of a fluid flowing therethrough; and
   a flow control member disposed in the internal bore of the cage.

2. The cage of claim 1, wherein the teardrop shaped orifices are inverted.

3. The cage of claim 1, wherein four or more teardrop shaped orifices are disposed in the sidewall of the cage.

4. A choke valve assembly for controlling fluid flow, comprising:
   a choke valve body comprising an internal chamber housing:
      a seat carrier comprising a sidewall, and
      a cage comprising a cylindrical member having a sidewall forming an internal bore, wherein one or more teardrop shaped orifices disposed through the sidewall of the cage and wherein the one or more teardrop shaped orifices reduces fluid turbulence; and
   a flow control member disposed in the internal bore of the cage and configured to control fluid volume as fluid flows through the orifices.

5. The choke valve assembly of claim 1, wherein the cage is disposed in an internal bore of the seat carrier and wherein a side wall of the seat comprises one or more orifices.

6. The choke valve assembly of claim 4, further comprising one or more orifices disposed in the side wall of the seat carrier that are aligned with a corresponding teardrop shaped orifice of the cage.

7. A method for controlling fluid flow, comprising:
   flowing fluid into an inlet of a choke valve body, wherein the choke valve body, comprises:

a choke valve body comprising an internal chamber housing:
  a seat carrier comprising a sidewall,
  a cage having a sidewall forming an internal bore,
  one or more teardrop shaped orifices disposed in the sidewall of the cage, and
  a flow control member disposed in the internal bore of the cage;
directing the fluid through the teardrop shaped orifices to the internal bore of the cage to reduce the turbulence of the fluid; and
moving the flow control member up or down across the teardrop shaped orifices to control fluid flow volume.

8. The method of claim 7, further comprising one or more elongated orifices disposed in the sidewall of the seat carrier.

* * * * *